United States Patent
Yamada

(10) Patent No.: US 8,063,894 B2
(45) Date of Patent: Nov. 22, 2011

(54) IMAGE DISPLAY SYSTEM, IMAGE DISPLAY DEVICE, AND IMAGE DATA OUTPUT DEVICE

(75) Inventor: Norihiko Yamada, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 752 days.

(21) Appl. No.: 11/470,025

(22) Filed: Sep. 5, 2006

(65) Prior Publication Data

US 2007/0052847 A1 Mar. 8, 2007

(30) Foreign Application Priority Data

Sep. 6, 2005 (JP) .................. 2005-258407

(51) Int. Cl.
*G09G 5/00* (2006.01)
*G06K 9/36* (2006.01)
(52) U.S. Cl. .......... 345/204; 345/629; 382/232
(58) Field of Classification Search .......... 345/204, 345/629; 382/232
See application file for complete search history.

(56) References Cited

U.S. PATENT DOCUMENTS

| | | | |
|---|---|---|---|
| 6,714,591 B1 * | 3/2004 | Katata et al. ............. | 375/240.08 |
| RE38,564 E * | 8/2004 | Eifrig et al. ............. | 382/236 |
| 6,774,912 B1 * | 8/2004 | Ahmed et al. ............. | 345/629 |
| 2002/0011998 A1 * | 1/2002 | Tamura ............. | 345/204 |
| 2002/0174440 A1 * | 11/2002 | Usuba et al. ............. | 725/110 |
| 2003/0128197 A1 * | 7/2003 | Turner et al. ............. | 345/204 |

FOREIGN PATENT DOCUMENTS

| | | |
|---|---|---|
| JP | A-08-172601 | 7/1996 |
| JP | A-2000-184346 | 6/2000 |
| JP | A-2004-069996 | 3/2004 |

* cited by examiner

*Primary Examiner* — Amr Awad
*Assistant Examiner* — Randal Willis
(74) *Attorney, Agent, or Firm* — Oliff & Berridge PLC

(57) ABSTRACT

An image display system includes: an image data output device that multiplexes and outputs raster data and compressed moving picture data; and an image display device that is connected to the image data output device through a transmission line and displays an image on the basis of image data output from the image data output device. The image display system is capable of displaying a high-quality moving picture on the image display device by reducing the amount of image data flowing through the transmission line without imposing excessive load on the image data output device, the image display device, the image data output device, an image processing program, and a computer-readable recording medium having the image processing program recorded therein.

20 Claims, 10 Drawing Sheets

IMAGE DISPLAY SYSTEM, IMAGE DISPLAY DEVICE, AND IMAGE DATA OUTPUT DEVICE

BACKGROUND

1. Technical Field

The present invention relates to an image display system, an image display device, and an image data output device.

2. Related Art

In recent years, as an image processing function of a computer is highly improved, there is proposed a system in which a computer performs an image processing, which has been performed by an image display device in the related art, image processing data after the processing is transmitted to an image display device side in a digital format, and an image is displayed by the mage display device, such as a projector (for example, refer to JP-A-2004-69990).

In such an image display device, raster data captured by a frame memory of a video output unit of an image data output device, such as a computer, connected to the image display device, is encoded in a predetermined transmission format between the devices and is then transmitted and input to the image display device through a transmission line, such as a USB, and then the encoded data is decoded so as to realize image display.

In this case, if the raster data of a captured screen is transmitted under the uncompressed state, a large amount of data proportional to display resolution, color depth, and a frame rate flows through a transmission line, which causes a problem in that the load imposed on the transmission line or a driving circuit becomes significantly large.

In addition, even a main processor at the computer side should capture and transmit data corresponding to the entire screen, and accordingly, the load imposed on the main processor at the computer side becomes also large.

In order to solve the problems described above, there has been proposed a technique of reducing a required band in a transmission line by using a method in which only a part of the entire screen that has been updated as compared with a previous frame in a time manner, that is, only differential data, is transmitted. According to the technique, since only the differential part of a screen update is transmitted through a transmission line, the technique is very effective for transmitting screen data having a small amount of movement and a small update frequency or a narrow update range, which is typically displayed as a graphic screen by a computer.

However, in the case where an image data output device, such as a computer, reproduces a so-called moving picture based on a format specified by MPEG (moving picture experts group), for example, and then the moving picture is displayed on an image display device that is connected to the image data output device through a transmission line, it is general that a region where the moving picture is displayed occupies a relatively large area in the entire screen. In addition, if frame update is not made according to the frame rate of the moving picture, display based on the frame rate of the moving picture is not achieved. In this case, since a viewer can see dropping frames or jerky movement on the displayed moving picture, it is not possible to secure the quality of a display image. As a result, in order to display a moving picture, it is necessary to capture and transmit a large amount of data.

Furthermore, in the case where the moving picture is compressed moving picture data based on MPEG2 (ISO/IEC 13818-2) or the like, decoding of the moving picture, color conversion, a scaling, and a rasterizing process such as display processing need to be performed at the image data output device side, which also causes a problem in that the load imposed on the image data output device and the transmission line becomes even larger.

SUMMARY

An advantage of some aspects of the invention is that it provides an image display system capable of displaying a high-quality moving picture on an image display device by reducing the amount of image data flowing through a transmission line without imposing excessive load on an image data output device, an image display device, an image data output device, an image processing program, and a computer-readable recording medium having the image processing program recorded therein.

According to an aspect of the invention, an image display system includes: an image data output device that multiplexes and outputs raster data and compressed moving picture data; and an image display device that is connected to the image data output device through a transmission line and displays an image on the basis of image data output from the image data output device. The image data output device includes: a raster data acquisition unit that acquires the raster data; a compressed moving picture data acquisition unit that acquires the compressed moving picture data; a moving picture display region data generating unit that generates moving picture display region data indicating a display region, of a moving picture based on the compressed moving picture data, within the raster data; a data multiplexer that multiplexes the raster data acquired by the raster data acquisition unit, the compressed moving picture data acquired by the compressed moving picture data acquisition unit, and the moving picture display region data generated by the moving picture display region data generating unit; and a data transmitting unit that transmits multiplexed data through the transmission line. The image display device includes: a data receiving unit that receives data, which is transmitted from the image data output device, through the transmission line; a data demultiplexer that separates the data received by the data receiving unit into individual data; a moving picture rasterizing unit that performs a rasterizing process for separated compressed moving picture data so as to generate moving picture raster data; a display raster data synthesizing unit that synthesizes the moving picture raster data generated by the moving picture rasterizing unit and the raster data so as to generate display raster data; and an image forming unit that forms an image on the basis of the generated display raster data.

Here, the raster data means image data (data loaded on a video memory as information corresponding to each pixel, not moving picture data generally displayed by video overlay) based on graphic data generated by the computer or the like. The compressed moving picture data means image data subjected to a compression process according to a predetermined format, such as MotionJPEG and MPEG, and preferably, the invention is implemented by adopting a moving picture format, such as MPEG2 or MPEG4.

Moreover, the moving picture rasterizing unit included in the image display device decodes the compressed moving picture data and performs processes, such as a scaling and conversion of brightness or color of each pixel displayed by the image forming unit.

In the aspect of the invention, since the image display system includes the functional units described above, in advance, the compressed moving picture data is not decoded by the image data output device side, but the compressed moving picture data is transmitted to the image display device side through the transmission line and is then rasterized to be displayed. Accordingly, since the image data output device does not need to decode the compressed image data, a process load imposed on the image data output device is alleviated. As a result, excessive load is not imposed on the image data output device. In addition, since the compressed moving picture data flows through a transmission line under the compressed state, the amount of image data transmitted and received is reduced. In addition, since compressed moving picture data is decoded and rasterized on the image display device, a high-quality moving picture can also be obtained.

In the aspect of the invention, preferably, the image data output device further includes a differential data generating unit that generates differential data between data before and after a screen is updated, the raster data acquisition unit acquires, as raster data, the differential data generated by the differential data generating unit, and the image display device further includes a raster data reconstructing unit that reconstructs raster data on the basis of separated raster data and display raster data before a screen is updated.

In the aspect of the invention, when the screen update occurs in the raster data display region, only the differential data is transmitted to the image display device through the transmission line. Accordingly, since the amount of data flowing through the transmission line is reduced, it is possible to alleviate the load imposed on the transmission line.

Furthermore, in another aspect of the invention, preferably, the image display device further includes: a synchronization signal generating unit that generates an image synchronizing signal for updating a screen of the display raster data generated by the data synthesizing unit on the basis of one of frame rate information included in the compressed moving picture data, refresh rate information output from the image data output device, and update period information used as a data generation period by the differential data generating unit; and a scanning unit that performs a scanning process in the image forming unit on the basis of the generated image synchronizing signal.

Here, preferably, when a moving picture is displayed, a synchronizing signal for the screen update of the scanning unit in the image display device is generated on the basis of the frame rate information included as image attribute information in the compressed moving picture data.

In the aspect of the invention, since an image can be formed by using an optical synchronizing signal corresponding to the type of an image displayed on the image display device, a high-quality image can be displayed on the image display device. Moreover, in the case when a moving picture is displayed, the synchronizing signal is generated on the basis of the frame rate information included as image attribute information in the compressed moving picture data, such that the screen update based on the frame rate of the moving picture can be performed. As a result, it is possible to prevent, for example, dropping frames or jerky movement from occurring on the moving picture, and accordingly, a high-quality moving picture can be displayed.

Furthermore, in the invention, preferably, the image display device further includes: an image/audio separating unit that separates audio data included in the compressed moving picture data when the moving picture raster data is generated by the moving picture rasterizing unit; an audio data decoder that decodes the audio data separated by the image/audio separating unit; an audio output unit that outputs audio decoded by the audio data decoder; and an audio output synchronization adjusting unit that synchronizes timing of the audio output made by the audio output unit with genera-tion time of the moving picture raster data generated by the moving picture rasterizing unit.

In the invention, in the case when it takes time to perform a rasterizing process for the compressed moving picture data, the audio output synchronization adjusting unit can cause audio to be output from the audio output unit in synchronization with a moving picture according to the generation time of the moving picture raster data. As a result, since there is no problem related to the timing between an image output and an audio output, that is, lip-sync, a viewer does not have any sense of incongruity.

The image display system according to the aspect of the invention includes an image display device and an image data output device, and each of the image display device and the image data output device has the following configuration.

According to another aspect of the invention, an image display device that is connected to an image data output device that multiplexes and outputs raster data and compressed moving picture data through a transmission line and displays an image on the basis of image data output from the image data output device, the image data output device multiplexing and outputting raster data and compressed moving picture data, includes: a data receiving unit that receives data, which is transmitted from the image data output device, through the transmission line; a data demultiplexer that separates the data received by the data receiving unit into individual data; a moving picture rasterizing unit that performs a rasterizing process for separated compressed moving picture data so as to generate moving picture raster data; a display raster data synthesizing unit that synthesizes the moving picture raster data generated by the compressed moving picture rasterizing unit and the raster data so as to generate display raster data; and an image forming unit that forms an image on the basis of the generated display raster data. The image data output device is configured to multiplex and output the raster data, the compressed moving picture data, and moving picture display region data indicating a display region, of a moving picture based on the compressed moving picture data, within the raster data.

In the image display device described above, in is preferable to further include: an image/audio separating unit that separates audio data included in the compressed moving picture data when the moving picture raster data is generated by the moving picture rasterizing unit; an audio data decoder that decodes the audio data separated by the image/audio separating unit; an audio output unit that outputs audio decoded by the audio data decoder; and an audio output synchronization adjusting unit that synchronizes timing of the audio output made by the audio output unit with generation time of the moving picture raster data generated by the moving picture rasterizing unit.

Further, according to still another aspect of the invention, an image data output device that multiplexes and outputs raster data and compressed moving picture data and displays an image on an image display device connected to the image data output device through a transmission line includes: a raster data acquisition unit that acquires the raster data; a compressed moving picture data acquisition unit that acquires the compressed moving picture data; a moving picture display region data generating unit that generates moving picture display region data indicating a display region, of a moving picture based on the compressed moving picture data, within the raster data; a data multiplexer that multiplexes the raster data acquired by the raster data acquisition unit, the compressed moving picture data acquired by the compressed moving picture data acquisition unit, and the moving picture display region data generated by the moving picture display region data generating unit; and a data transmitting unit that transmits multiplexed data through the transmission line.

Furthermore, according to still another aspect of the invention, there may be provided an image processing program serving as the functional units described above for an image data output device, such as a computer. In addition, there may be provided a recording medium having the image processing program recorded therein.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the accompanying drawings.

1. First Embodiment

Figure 1:
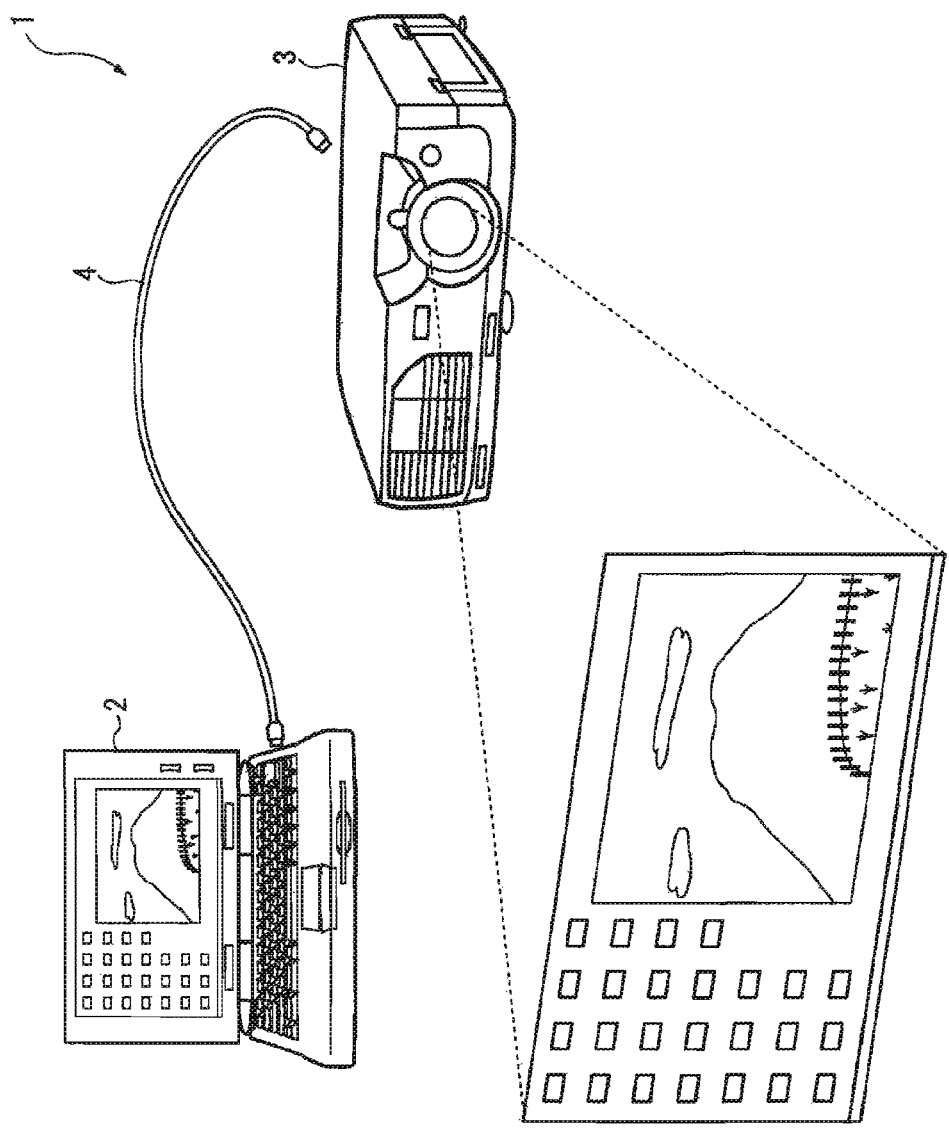
FIG. 1 is a perspective view schematically illustrating the configuration of an image display system according to a first embodiment of the invention.

FIG. 1 illustrates an image display system 1 according to a first embodiment of the invention. The image display system 1 includes a computer 2 serving as an image data output device, a projector 3 serving as an image display device, and a USB cable 4 serving as a transmission line by which the computer 2 and the projector 3 are connected to each other. Image data output from the computer 2 is input to the projector 3 through the USB cable 4, and an image on a local display of the computer 2 can be displayed as a projection image on a screen. The USB cable 4 is a cable based on the specifications, such as USB 1.1 or USB 2.0, and two-way communication between connected devices can be performed through the USB cable 4.

(1) Structure of Computer 2

Figure 2:
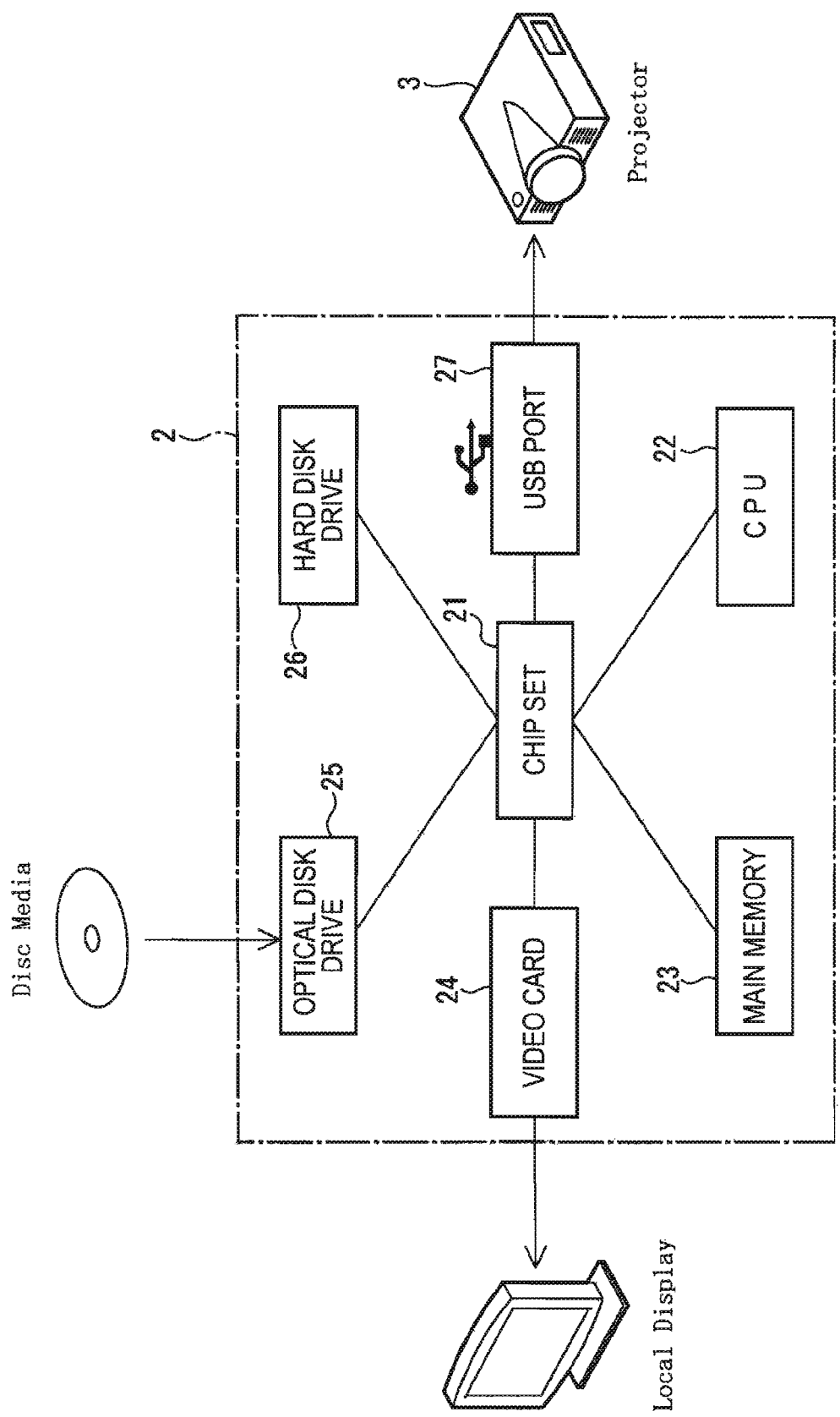
FIG. 2 is a view schematically illustrating the configuration of an image data output device according to the present embodiment.

As shown in FIG. 2, the computer 2 serving as an image data output device includes a chip set 21 provided on a mother board, a CPU 22, a main memory 23, a video card 24, an optical disk drive 25, a hard disk drive 26, and a USB port 27, and the chip set 21 is connected to the CPU 22, the main memory 23, the video card 24, the optical disk drive 25, the hard disk drive 26, and the USB port 27 through bus lines.

The CPU 22 serves as an operation processing unit that executes various programs by using the main memory 23 as an operation region. For example, although not shown in FIG. 2, even graphic data generated by executing an operating system is generated by the CPU 22.

The video card 24 performs an image processing for image data input to the computer 2 and performs image display on the local display belonging to the computer 2. Although not shown, the video card 24 includes a processor, which performs an image processing for image to be output to the local display, a video memory that stores image data to be processed, or the like. In addition, in the present embodiment, even though the computer 2 is configured to include the local display, the computer 2 does not necessarily need to include the local display. Moreover, the video card 24 does not necessarily need to be a separate device. For example, the video card 24 may be a graphic function built in a chip set.

The optical disk drive 25 is a device that reproduces optical disk media, such as a CD (compact disc) and a DVD (digital versatile disc). If an optical disk that stores compressed moving picture data is inserted into the optical disk drive 25, the optical disk drive 25 reproduces the moving picture data stored in the optical disk and then outputs the moving picture data to the main memory 23 that is connected to the CPU 22 through the chip set 21

The hard disk drive 26 is a storage device that stores a program executed in the CPU 22 or data generated by operating the computer 2. In addition, since the hard disk drive 26 can store image data, the hard disk drive 26 may output the stored image data in response to the request of a program operating on the CPU 22.

The USB port 27 is a terminal located at the side of the computer 2 to which the above-described USB cable 4 is connected, and input and output of the USB port 27 are controlled by the chip set 21, and thus a data transmission unit referred in the invention is implemented.

Figure 3:
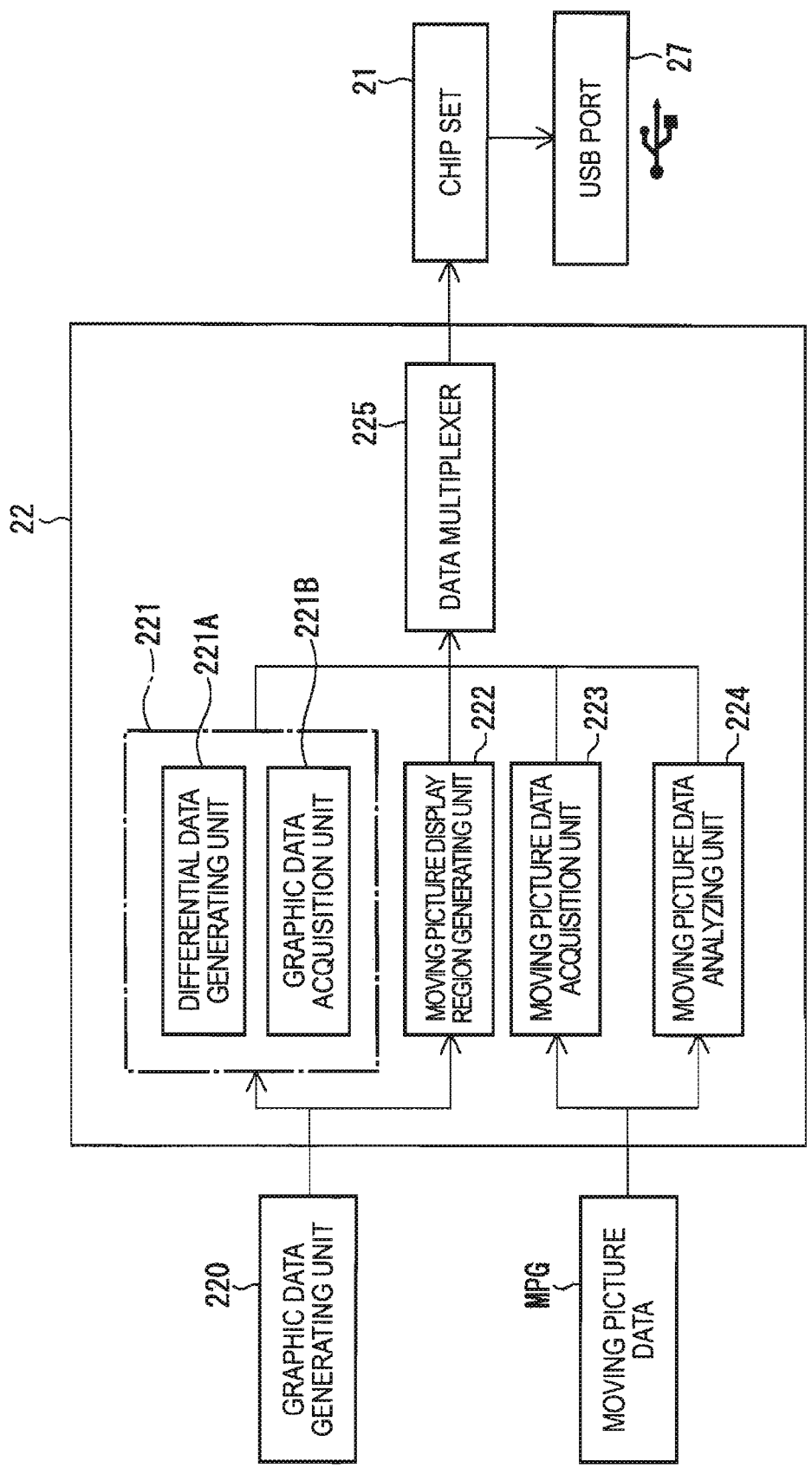
FIG. 3 is a functional block diagram illustrating the image data output device according to the present embodiment.

When an image processing with respect to graphic image data input by the CPU 22 and stream-output moving picture data is performed, an image processing program having functional units shown in FIG. 3 is executed on the CPU 22. Specifically, the CPU 22 is configured to include a graphic image data acquisition unit 221, a moving picture display region generating unit 222, a moving picture data acquisition unit 223, a moving picture data analyzing unit 224, and a data multiplexer 225.

The graphic image data acquisition unit 221 serving as a raster data acquisition unit acquires graphic data generated by a graphic data generating unit 220 that operates on the operating system, and the graphic image data acquisition unit 221 includes a differential data generating section 221A and a graphic data acquisition section 221B.

The differential data generating section 221A generates differential data of graphic images updated in a period of, for example, a refresh rate of the computer 2. For example, the differential data generating section 221A captures images before and after performing the updating process and then compares the images with each other so as to generate a changed part as differential data.

The graphic data acquisition section 221B acquires only the differential data, which is generated by the differential data generating section 221A, as graphic data, and outputs the acquired graphic data to the data multiplexer 225 to be described later.

The moving picture display region generating unit 222 serving as a moving picture display region data generating unit acquires, from input graphic data, on which part of the graphic screen based on the graphic data the moving picture data is to be displayed. For example, the moving picture display region generating unit 222 generates moving picture display region data indicating in which size and resolution and in which position of a graphic image the moving picture data should be displayed.

The moving picture data acquisition unit 223 serving as a compressed moving picture data acquisition unit acquires moving picture data that is compressed, without decoding moving picture data MPG sequentially input as a bit stream from the optical disk drive 25 or the hard disk drive 26. Here, a compression format of the moving picture data includes MPEG2, MPEG4, MotionJPEG, and the like.

The moving picture data analyzing unit 224 acquires image attribution information, such as a frame rate, a bit rate, an aspect ratio, and resolution, which are included in the input moving picture data. The acquired image attribution information may be utilized as a motion control parameter in a multiplexing process or a transmission process for image data performed at a subsequent stage. In addition, for example, in the case when the compression format of moving picture data is MPEG2, the image attribution information is recorded on the sequence header (SH) of MPEG2 bit stream, and the moving picture data analyzing unit 224 can acquire the image attribution information of a moving picture by acquiring the information recorded on the header.

The data multiplexer 226 multiplexes the graphic data acquired by the graphic image data acquisition unit 221, the moving picture display region data generated by the moving picture display region generating unit 222, and the moving picture data acquired by the moving picture data acquisition unit 223. As a multiplexing method includes an MPEG-TS (transport stream) method, an MPEG-PS (program stream) method, or the like, which are specified by ISO/IEC-13818-1. At this time, the data multiplexer 226 can also multiplex image correction data, such as a color and a gamma (γ) value, set on the computer 2, in the same manner as described above.

Data multiplexed by the data multiplexer 226 is output and transmitted as serial data from the USB port 27 through the chip set 21.

(2) Structure of Projector 3

Figure 4:
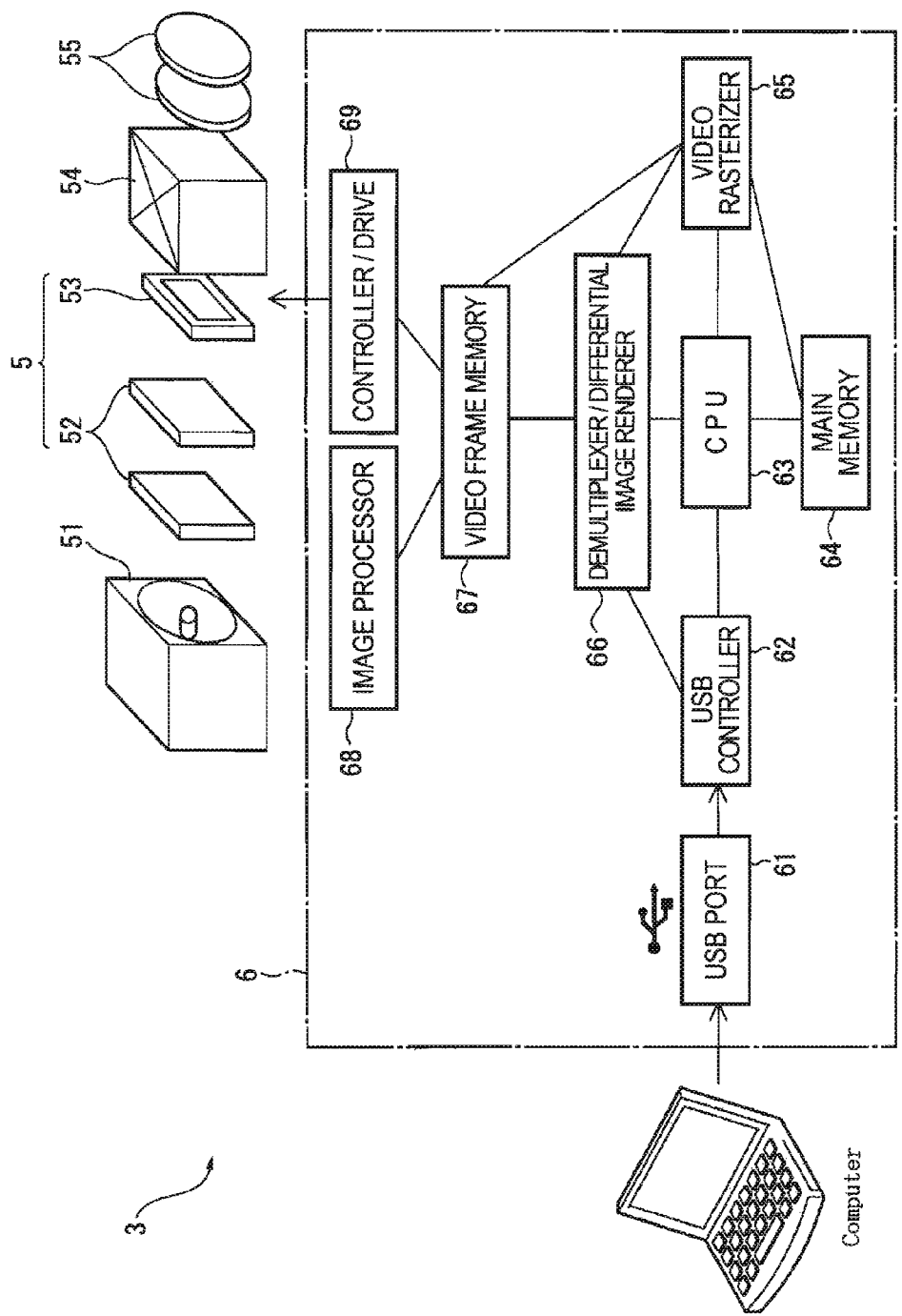
FIG. 4 is a view schematically illustrating the configuration of an image display device according to the present embodiment.

As shown in FIG. 4, the projector 3 serving as an image display device is configured to include an optical engine 5 that forms an optical image and an image processing unit 6 that performs an image processing for the image data output and transmitted from the computer 2.

The optical engine 5 includes a light source unit 51, an integrator illumination optical system 52, a liquid crystal panel 53 serving as an image forming unit, a color-combining optical system 54, and a projection lens 55.

Light emitted from the light source unit 51 is divided into a plurality of partial light components by means of the integrator illumination optical system 52 so as to be uniform illumination light, then the divided light components are modulated by the liquid crystal panel 53 on the basis of input image data, and then the modulated light components are projected onto a screen through the color-combining optical system 54 and the projection lens 55. Moreover, although not shown in FIG. 4, in the projector 3 according to the present embodiment, the light modulation is performed by the liquid crystal panel 53 for each of the light components corresponding to R, G, and B colors. Thus, the color-combining optical system 54 synthesizes light components corresponding to R, G, and B colors, which have been subjected to an optical modulation process, and thus a color image is formed.

The image processing unit 6 performs a predetermined image processing on the basis of the image data input from the computer 2, and performs a driving control of the liquid crystal panel 53 included in the optical engine 5 so as to form an optical image. The image processing unit 6 includes various circuit elements mounted on a circuit board provided within the projector 3.

Specifically, the image processing unit 6 includes a USB port 61, a USB controller 62, a CPU 63, a main memory 64, a video rasterizer 65, a demultiplexer 66, a video frame memory 67, an image processor 68, and a panel controller 69.

The USB port 61 is a terminal to which the USB cable 4 is connected and to which the image data output from the computer 2 is input. The USB controller 62 is a circuit element that controls input/output of the USB port 61. In addition, the USB port 61 and the USB controller 62 are configured to serve as a data receiving unit referred in the invention.

The CPU 63 performs the entire control for the image processing unit 6 by executing various programs with the main memory 64 as an operation region.

The video rasterizer 65 serving as a moving picture rasterizing unit decodes moving picture data based on the format, such as MPEG2, and generates moving picture raster data. The moving picture raster data decoded by the video rasterizer 65 is input to the video frame memory 67 to be described later.

The demultiplexer 66 serving as a data demultiplexer separates the various data multiplexed by the data multiplexer 225 of the computer 2, and the various data that has been separated is processed by other circuit elements, which will be described in detail later. In addition, the demultiplexer 66 in the present embodiment also serves as a differential image renderer, which will also be described in detail later.

The video frame memory 67 accumulates image raster data formed by various circuit elements and stores display raster data that is finally displayed on the liquid crystal panel 53. The display raster data may be changed according to the data writing period of the liquid crystal panel 53 determined by the panel controller 69.

The image processor 68 serving as a raster data synthesizing unit generates display raster data by finally synthesizing the data separated by the demultiplexer 66, and in order to ensure the color reproducibility of the liquid crystal panel 53, performs correction processes, such as brightness unevenness correction, color unevenness correction, or V-Tγ correction inherent in the liquid crystal panel 53, in addition to the synthesis of graphic data and moving picture data.

The panel controller 69 serving as a scanning unit is a circuit element that performs a driving control of the liquid crystal panel 53. By means of the panel controller 69, the driving control of each pixel in the image display region of the liquid crystal panel 53 is performed. Further, in the present embodiment, the three-plate-type projector 3 described above is provided. Accordingly, although not shown in the drawing, the panel controller 69 is provided to the liquid crystal panel 53 for each of the light components corresponding to R, G, and B colors.

As described above, in the present embodiment, the image processing unit 6 has a configuration in which a plurality of circuit elements is combined. However, the hardware configuration of the image processing unit is not limited thereto. For example, one chip microprocessor may perform all the processes if it is an extremely high-performance processing unit.

Figure 5:
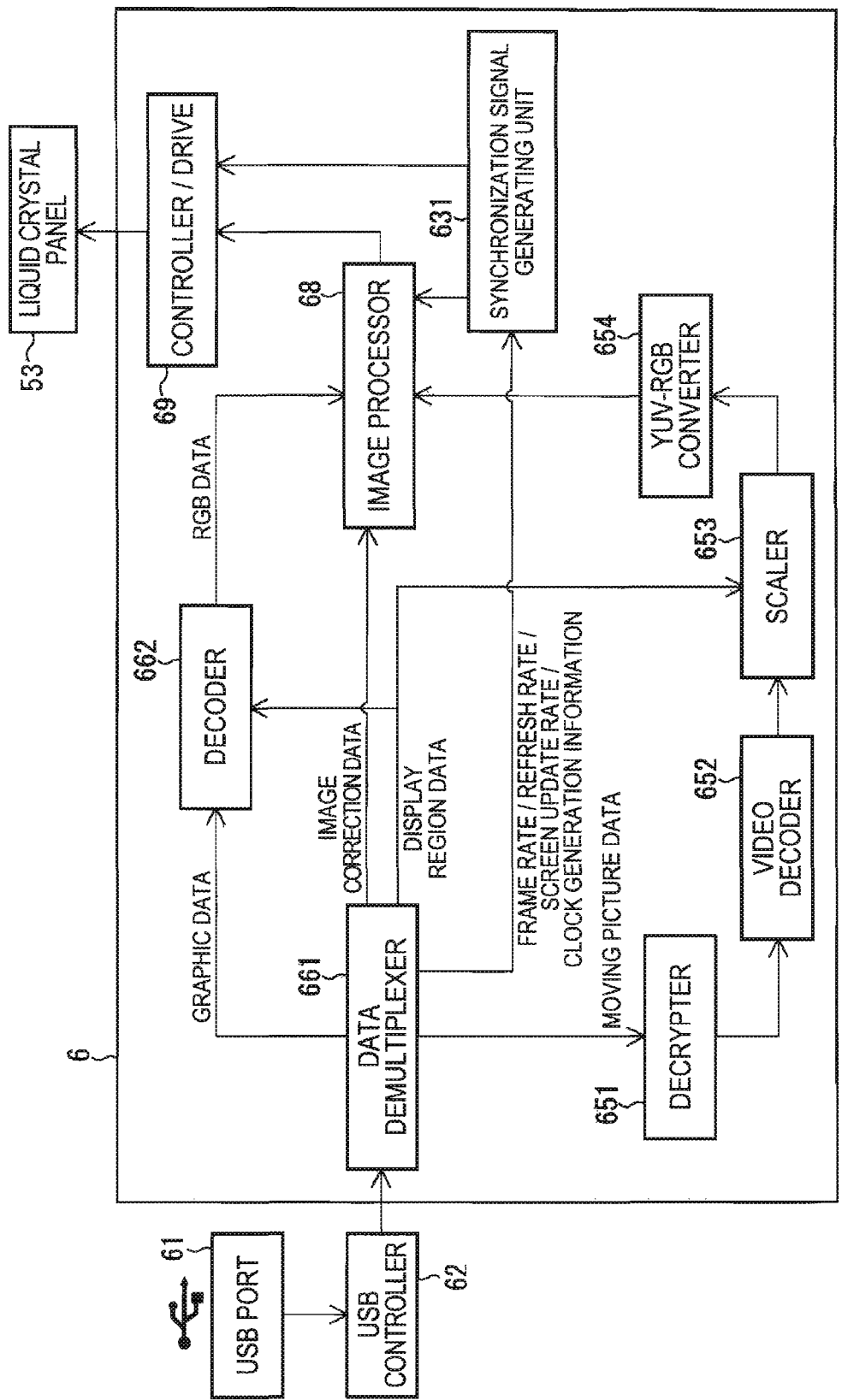
FIG. 5 is a functional block diagram illustrating the image display device in the present embodiment.

The functional block configuration of the image processing unit 6 is shown in FIG. 5.

Of the circuit elements of the image processing unit 6, the demultiplexer 66 includes a data demultiplexer 661 and a decoder 662 as functional units, and the video rasterizer 65 includes a decryptor 651, a video decoder 652, a scaler 653, and a YUV-RGB converter 654 as functional units. Moreover, the CPU 63 includes a synchronization signal generating unit 631 as a functional unit for the purpose of synchronization of a screen update.

The data demultiplexer 661 separates multiplexed data, which has been input through the USB port 61, into individual data, and specifically, the multiplexed data is divided into graphic data, moving picture data, moving picture display region data, and image correction data.

In addition, the data demultiplexer 661 outputs the separated graphic data to the decoder 662, the separated moving picture data to the decryptor 651, the separated moving picture display region data to the decoder 662 and the scaler 653. Moreover, the data demultiplexer 661 outputs to the synchronization signal generating unit 631 information, such as a frame rate included in the image attribution information acquired at the time of a moving picture decoding process performed by the video decoder 652 to be described later, a refresh rate set by the computer 2, and a screen update period of graphic data input as differential data.

The decoder 662 functions as the differential image renderer described above and performs a conversion such that graphic data output from the data demultiplexer 661 serves as a graphic image forming one screen. In the present embodiment, as described above, since the differential data is transmitted as graphic data, the decoder 662 holds graphic data before updating in the main memory 64, and if the graphic data as new differential data is input, the decoder 662 rewrites only a part of data corresponding to the differential data so as to generate new graphic data. The graphic data converted by the decoder 662 is output as RGB data to the image processor 68. That is, in the present embodiment, the decoder 662 functions as a raster data reconstructing unit referred in the invention.

Moreover, the decoder 662 sets a region, in which a moving picture should be displayed, within a graphic image on the basis of the moving picture display region data output from the data demultiplexer 661, and generates graphic data corresponding to a region other than the region where the moving picture is displayed.

The decryptor 651 decodes parts, which are encoded for copy protection related to, for example, copyright, before decoding the input moving picture data, and performs a processing that causes the input moving picture data to be decoded by the video decoder 652 located at a subsequent stage. In addition, the decryptor 651 is not necessarily required, but the decryptor 651 is required in the case of moving picture data including the copy protection.

The video decoder 652 decodes the moving picture data transmitted under the compressed state. For example, in the case when the compression format is MPEG2, the video decoder 652 decodes the compressed moving picture data to moving picture data based on a raster data format in a unit of GOP (group of pictures) by applying inverse DCT (discrete cosine transform) to the compressed moving picture data.

The scaler 653 performs an expansion and contraction adjustment for the decoded moving picture data, and performs the adjustment depending on the capacity of a display device, such as resolution or an aspect ratio. The scaler 653 sets a region where moving picture data is to be displayed and resolution within the region on the basis of the resolution information included in the moving picture, the specification of the liquid crystal panel 53, the moving picture display region data output from the data demultiplexer 661, or the like.

The YUV-RGB converter 654 converts data, based on the YUV format, of the moving picture data to the RGB format for a computer, and the conversion is performed on the basis of a predetermined relational expression.

As described above, the image processor 68 synthesizes the graphic data decoded by the decoder 662 and the moving picture data decoded by the video decoder 652 so as to generate display raster data. Furthermore, the image processor 68 performs a correction process on the basis of the image correction data, which is set by the computer 2, output from the data multiplexer 661 and picture correction data set to be inherent in the liquid crystal panel 53, and stores display raster data after the correction in the video frame memory 67.

The synchronization signal generating unit 631 generates a synchronizing signal for screen update of the panel controller 69 on the basis of information on the screen update output from the data demultiplexer 661. In the present embodiment, the synchronizing signal is generated on the basis of the frame rate obtained from the serial header of the moving picture data. Moreover, the synchronizing signal generated by the synchronization signal generating unit 631 is also output to the image processor 68, and the image processor 68 sets the timing at which the display raster data is stored in the video frame memory 67 on the basis of the synchronizing signal.

(3) Operation of Image Display System 1

Figure 6:
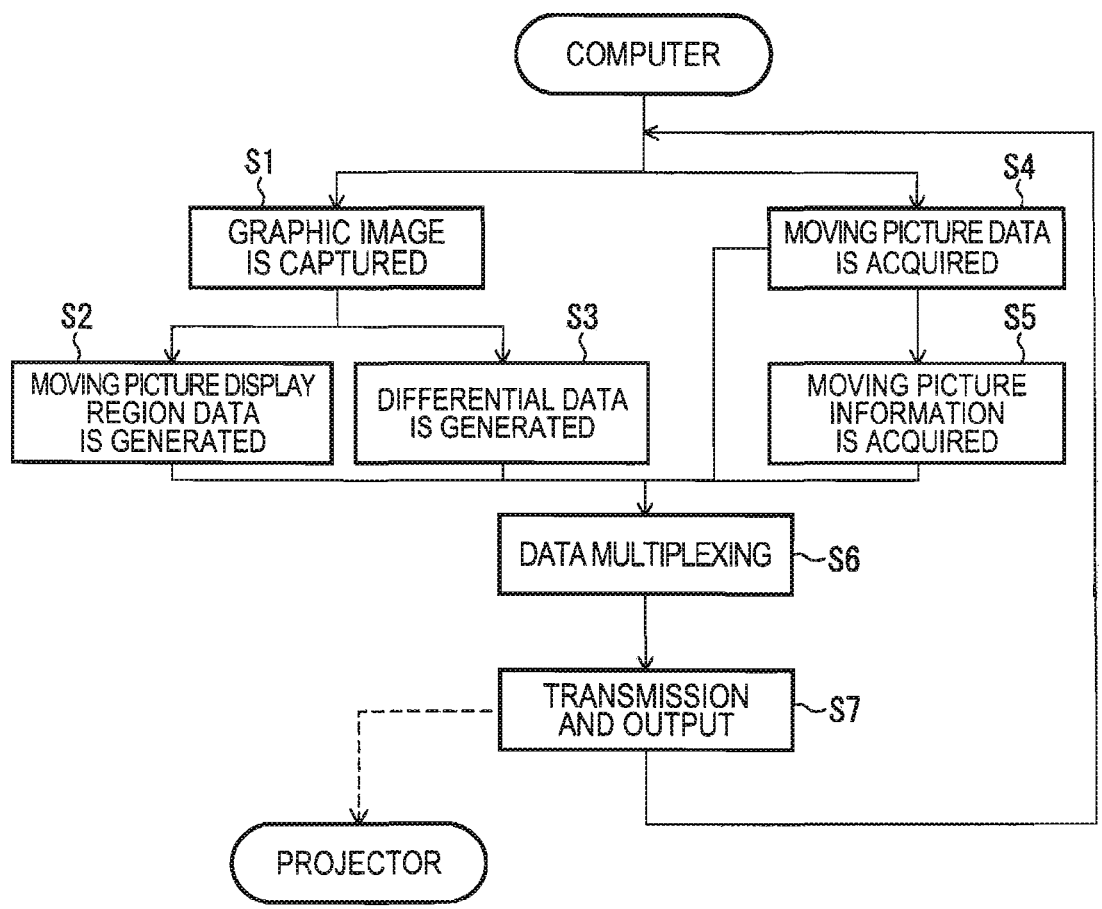
FIG. 6 is a flow chart illustrating an operation of the image display system according to the present embodiment.
Figure 7:
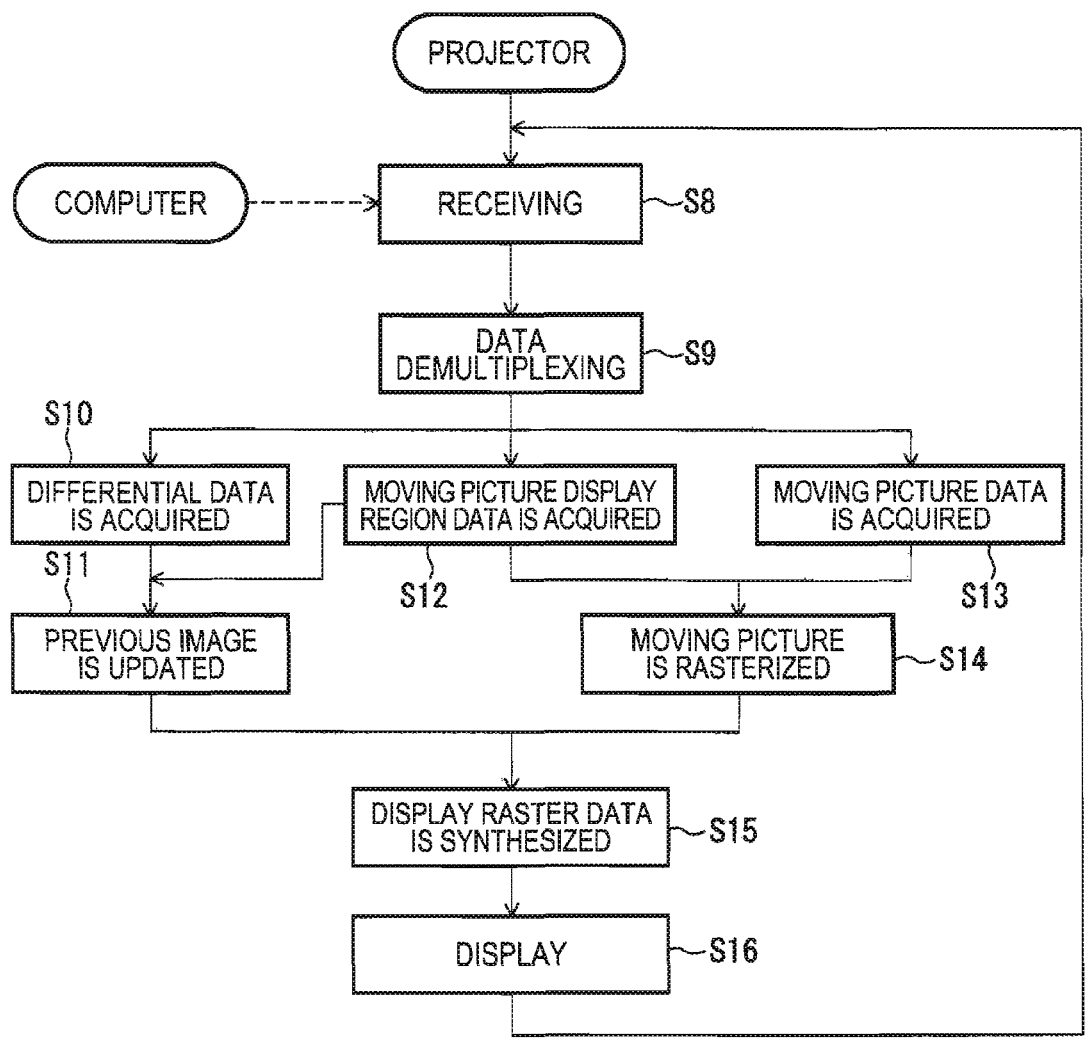
FIG. 7 is a flow chart illustrating an operation of the image display system according to the present embodiment.

Next, an operation of the image display system 1 having the above-described configuration will be described with reference to flow charts shown in FIGS. 6 and 7.

(3-1) Process at the Side of Computer 2

First, the graphic image data acquisition unit 221 captures a graphic image that is currently displayed and then acquires the captured graphic image as graphic data (process S1).

Then, the differential data generating section 221A of the graphic image data acquisition unit 221 generates differential data corresponding to an updated part on the basis of a graphic image, which has been previously captured, and the graphic image that has been captured this time (process S2). In addition, the moving picture display region generating unit 222 generates moving picture display region data, such as the X-Y position on a screen, the size, and the resolution, with respect to a moving picture display region on the basis of the captured graphic image (process S3).

On the other hand, in parallel with the acquisition of the graphic data, the moving picture data acquisition unit 223 acquires moving picture data input from the optical disk drive 25 or the like without performing a rasterizing process (process S4). Then, the moving picture data analyzing unit 224 acquires, as image attribution information, various information, such as a frame rate, a bit rate, an aspect ratio, and resolution of the moving picture data, from a part of the sequence header (in the case of MPEG2) of the acquired moving picture data processing S5).

If the above variety of information is acquired, the data multiplexer 225 multiplexes the moving picture data in the format based on the MPEG-TS, the MPEG-PS, or the like (process S6). The multiplexed data is encoded by means of a function of the chip set 21 serving as a USB controller, and the encoded data is output from the USB port 27 to the projector 3 through the USB cable 4 (process S7).

(3-2) Process at the Side of Projector 3

The multiplexed data output from the computer 2 is received by the USB port 61 and the USB controller 62 (process S8), is then decoded by the USB controller 62 in the format that can be processed in the image processing unit 6, and is then output to the data demultiplexer 661.

The data demultiplexer 661 separates the multiplexed data into individual graphic data, moving picture display region data, and moving picture data (process S9).

The decoder 662 acquires the separated graphic data as differential data (process S10), and updates graphic data, in which only a part corresponding to the differential data is changed, on the basis of a graphic image before updating (process S11).

In addition, the video rasterizer 65 acquires moving picture data and moving picture display region data (processes S12 and S13), and performs a rasterizing process on the moving picture on the basis of image attribution information included in the data and the moving picture data (processing S14).

If rasterization of the graphic data performed by the decoder 662 and rasterization performed by the video rasterizer 65 are completed, the image processor 68 synthesizes the rasterized data so as to generate display raster data (process S15). Furthermore, the image processor 68 performs a picture correction process inherent in the liquid crystal panel 53, forms an optical image on the liquid crystal panel 53 by the scanning process performed by the panel controller 69, and displays a projection image on a screen through the projection lens 55 (process S16).

In the present embodiment described above, a process, such as the screen update, with respect to the graphic data as raster data is performed by only the computer 2, and the moving picture data as compressed moving picture data is directly transmitted to the projector 3 so as to be rasterized by the video rasterizer 65 of the projector 3, without being decoded in the computer 2. Accordingly, it is advantageous in that the image processing load at the side of the computer 2 is reduced. In addition, since the moving picture data is output to the USB cable 4, which serves as a transmission line, under the compressed state, it is possible to reduce the communication load imposed on the transmission line. In particular, since the process of rasterizing the moving picture data is performed by the projector 3 side, the communication speed of the transmission line is controlled, which makes it possible to prevent, for example, dropping frames or jerky movement from occurring on the displayed moving picture.

2. Second Embodiment

Next, a second embodiment of the invention will be described. In addition, in the following description, the same components as those described above have the same reference numerals, and a detailed description thereof will be omitted.

In the first embodiment described above, the projector 3 serving as an image display device performs only image display on the basis of the compressed moving picture data output from the computer 2.

Figure 8:
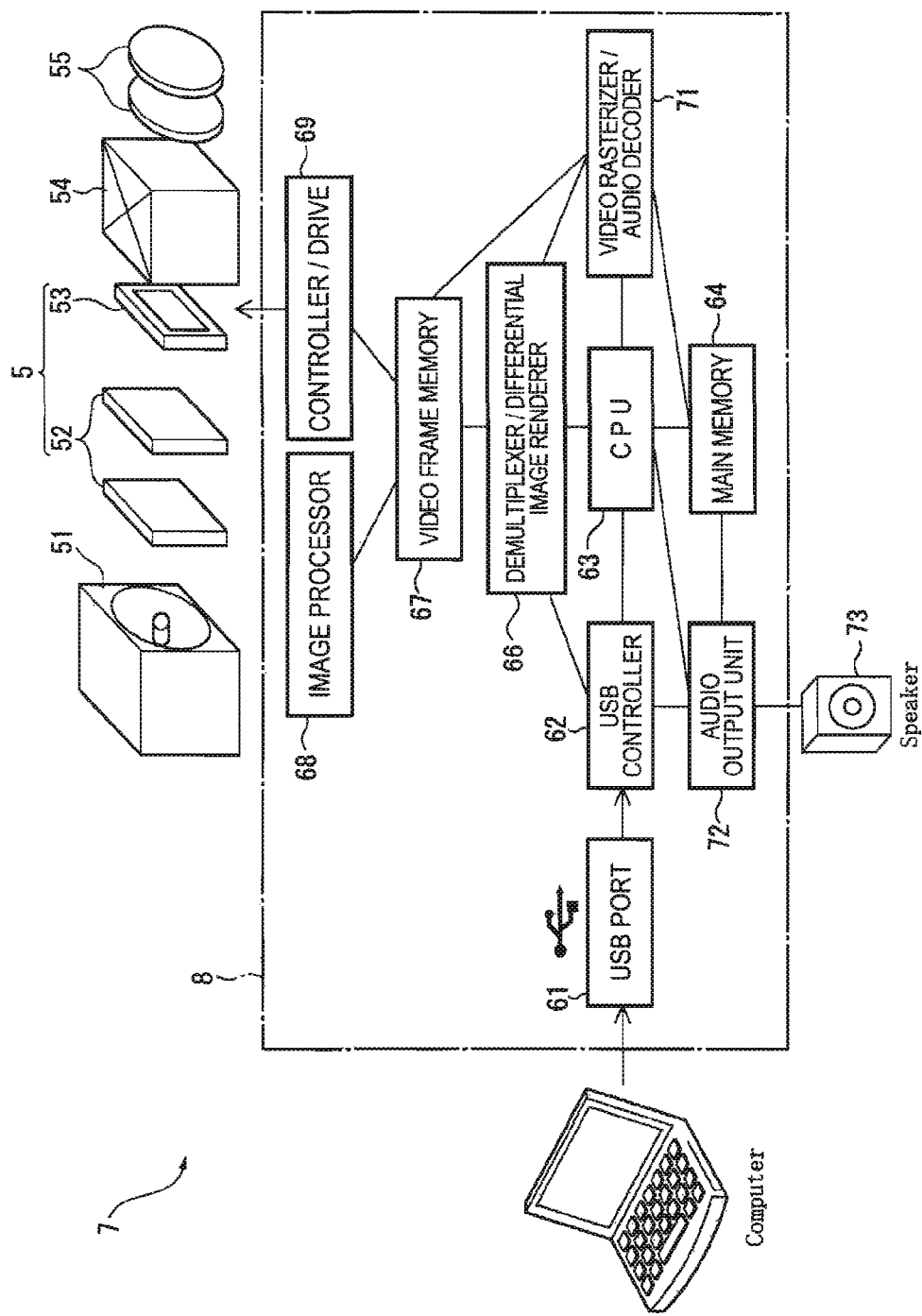
FIG. 8 is a perspective view schematically illustrating the configuration of an image display system according to a second embodiment of the invention.

On the other hand, as shown in FIG. 8, an image display system according to the second embodiment is different from that according to the first embodiment in that a projector 7 is provided with a speaker 73 and audio data recorded in synchronization with image data is output from the speaker 73 when compressed moving picture data is decoded.

(1) Configuration of Image/Audio Processing Unit 8

Specifically, as shown in FIG. 8, the projector 7 according to the second embodiment includes circuit elements for audio output, and an image/audio processing unit 8 of the projector 7 includes a video rasterizer/audio decoder 71 and an audio output unit 72, in addition to a USB port 61, a USB controller 62, a CPU 63, a main memory 64, a demultiplexer 66, an image processor 68, and a panel controller 69, which are the same components as in the first embodiment.

The video rasterizer/audio decoder 71 has a function of rasterizing compressed moving picture data and a function of separating moving picture data and audio data from each other, which are included in the compressed moving picture data. Furthermore, the video rasterizer/audio decoder 71 also serves as an audio decoder that decodes the audio data. The audio data decoded by the video rasterizer/audio decoder 71 is stored in the main memory 64.

The audio output unit 72 sequentially converts the decoded audio data stored in the main memory 64 into analog data, amplifies the converted audio data, and then outputs the amplified audio data to the speaker 73.

Figure 9:
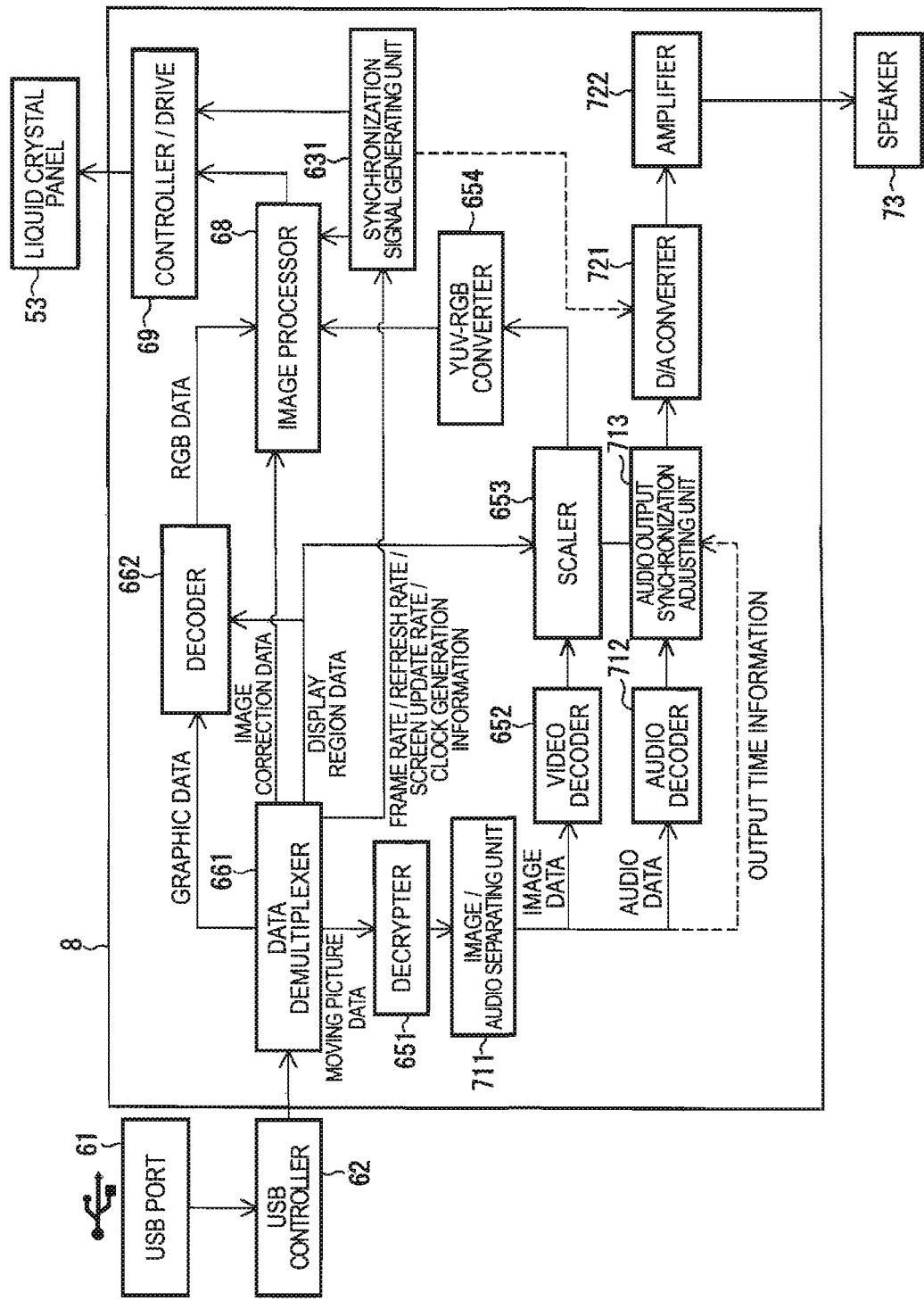
FIG. 9 is a functional block diagram illustrating the image display device in the present embodiment.

The functional block configuration of the image/audio processing unit 8 is shown in FIG. 9.

The video rasterizer/audio decoder 71 of the image/audio processing unit 8 includes an image/audio separating unit 711, an audio decoder 712, and an audio output synchronization adjusting unit 713 as functional units, in addition to a decryptor 651, a video decoder 652, a scaler 653, and a YUV-RGB converter 654 that also serve as functional units.

The image/audio separating unit 711 separates the moving picture data, which is separated by the data demultiplexer 661 and is then processed by the decryptor 651, into image data and audio data, and the separated image data is output to the video decoder 652 and the separated audio data is output to the audio decoder 712. In addition, in the present embodiment, the image/audio separating unit 711 is described as a unit different from the data demultiplexer 661 for the convenience of explanation. However, since the image/audio separating unit 711 and the data demultiplexer 661 are the same from the view point in which each of the image/audio separating unit 711 and the data demultiplexer 661 performs a separating process, a process using the same demultiplexer is possible. That is, the image/audio separating unit 711 and the data demultiplexer 661 may be configured as the same functional unit.

The audio decoder 712 decodes the audio data separated by the image/audio separating unit 711, and the decoded audio data is stored in the main memory 64.

The audio output synchronization adjusting unit 713 adjusts the timing of an audio output according to the output time stamp of moving picture and audio, which are encoded within the multiplexed stream of the moving picture and the audio, such that synchronization between the moving picture and the audio can be properly realized.

Specifically, the audio output synchronization adjusting unit 713 adjusts the timing of audio data output to a D/A converter 721, which is stored in the main memory 64, such that output timings based on PTS (presentation time stamp) of a moving picture and audio, which have been encoded at the time of multiplexing by MPEG-TS or MPEG-PS, match each other.

As shown in FIG. 9, the audio output unit 72 of FIG. 8 includes the D/A converter 721 and an amplifier 722, and the speaker 73 is connected to the amplifier 722.

The D/A converter 721 converts the audio data based on a digital format, which is stored in the main memory 64, to audio signals based on an analog format and then outputs the converted audio signals.

The amplifier 722 amplifies the audio signals, which have been converted to analog signals by the D/A converter 721, and then outputs the amplified audio signals to the speaker 73, and thus the audio data included in the moving picture data is output as audio from the speaker 73.

(2) Operation

Figure 10:
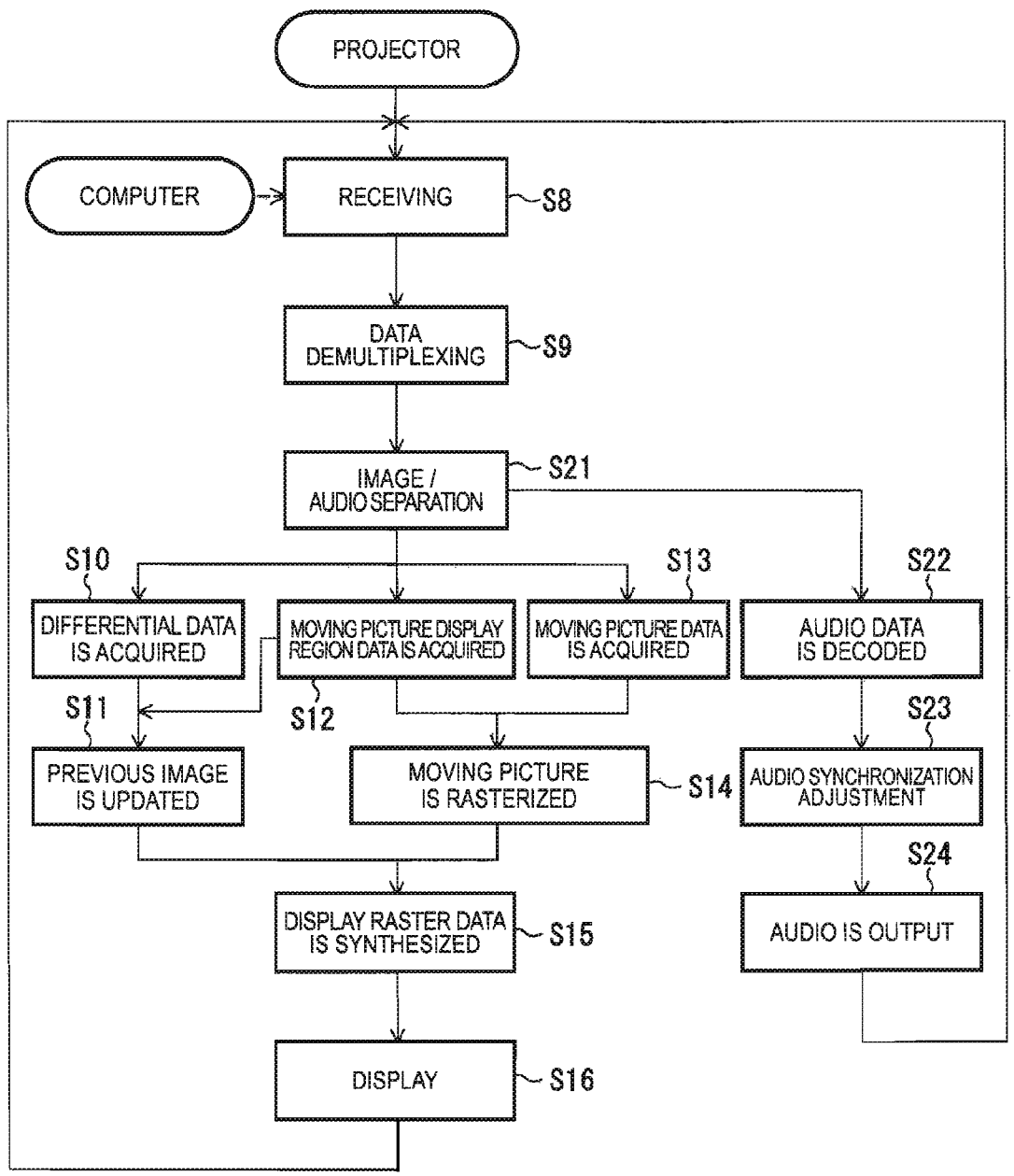
FIG. 10 is a flow chart illustrating an operation of the image display system according to the present embodiment.

Next, an operation of the image/audio processing unit 8 having the above-described configuration will be described with reference to a flow chart shown in FIG. 10. In addition, since the image data processing is the same as in the first embodiment, the same reference numerals are applied and a detailed description thereof will be omitted. Here, an audio data processing will be mainly described.

Moving picture data input from a computer is received by the USB port 61 and the USB controller (process S8), is then decoded in the format that can be processed by the image/audio processing unit 8, and is then output to the data demultiplexer 661.

The data demultiplexer 661 separates multiplexed data into individual data and outputs moving picture data to the image/audio separating unit 711 (process S9).

The image/audio separating unit 711 separates image data and audio data, which are included in the moving picture data separated by the data demultiplexer 661, from each other, and outputs output time information on a moving picture and audio to the audio output synchronization adjusting unit 713 (process S21).

The audio decoder 712 decodes compressed audio data and stores the decoded data in the main memory 64 (process S22).

When the audio decoder 712 performs the decoding process, the audio output synchronization adjusting unit 713 acquires output time information input from the image/audio separating unit 712, sets the delay time of an audio output on the basis of the output time information, and performs a synchronization adjustment of the audio output with respect to the moving picture output (process S23).

Data decoded by the audio decoder 712 is output to the D/A converter 721 on the basis of the delay time set by the audio output synchronization adjusting unit 713 and is then D/A converted by the D/A converter 721. Then, the audio signal is amplified by the amplifier 722 and then an audio output is obtained through the speaker 73 (process S24).

3. Modifications

In addition, the invention is not limited to the above-described embodiments, but various modifications and improvements may be made within the range where objects of the invention can be achieved.

For example, in the embodiments described above, the computer 2 has been used as an image data output device; however, the invention is not limited thereto. That is, it is possible to use a device, such as a DVD player or a game machine, as the image data output device.

Moreover, in the embodiments described above, the liquid crystal projector 3 has been adopted as an image display device; however, the invention is not limited thereto. For example, the invention may be applied to a projector having an optical modulation unit other than liquid crystal, such as a DLP, a backlight-type liquid crystal display, or a fixed-pixel-type display such as a plasma display or an organic EL display.

Furthermore, in the embodiments described above, the USB cable 4 has been used as a transmission line that connects the computer 2 and the projector 3 with each other; however, the invention is not limited thereto. That is, the invention may be applied to a system in which the image data output device and the image display device are connected to each other by means of a transmission line using LAN, such as TCP/IP, or a transmission line through which image can be transmitted, such as IEEE 1394.

In addition, the specific structure and shape in the embodiments of the invention may be substituted with different structure and shape within a range where the objects of the invention can be achieved.

The entire disclosure of Japanese Patent Application No. 2005-258407, filed Sep. 6, 2005 is expressly incorporated by reference herein.

What is claimed is:

1. An image display system comprising:
an image data output device that multiplexes and outputs raster data and compressed moving picture data; and
an image display device that is connected to the image data output device through a transmission line and displays an image on the basis of image data output from the image data output device,
wherein the image data output device includes:
a raster data acquisition unit that acquires the raster data;
a compressed moving picture data acquisition unit that acquires the compressed moving picture data;
a moving picture display region data generating unit that generates moving picture display region data indicating a display region, of a moving picture based on the compressed moving picture data, within the raster data;
a data multiplexer that multiplexes the raster data acquired by the raster data acquisition unit, the compressed moving picture data acquired by the compressed moving picture data acquisition unit, and the moving picture display region data generated by the moving picture display region data generating unit; and
a data transmitting unit that transmits multiplexed data through the transmission line, and
the image display device includes:
a data receiving unit that receives data, which is transmitted from the image data output device, through the transmission line;
a data demultiplexer that separates the data received by the data receiving unit into individual data;
a moving picture rasterizing unit that performs a rasterizing process for separated compressed moving picture data so as to generate moving picture raster data, wherein the rasterizing process includes decoding the separated compressed moving picture data, the decoding of the separated compressed moving picture data including generation of graphic data corresponding to a region other than the moving picture display region;
a display raster data synthesizing unit that synthesizes the moving picture raster data generated by the moving picture rasterizing unit and the raster data so as to generate display raster data;
an image forming unit that forms an image on the basis of the generated display raster data; and
the compressed moving picture data is not decoded by the image data output device.

2. The image display system according to claim 1, wherein the image data output device further includes a differential data generating unit that generates differential data between data before and after a screen is updated,
the raster data acquisition unit acquires, as raster data, the differential data generated by the differential data generating unit, and
the image display device further includes a raster data reconstructing unit that reconstructs raster data on the basis of separated raster data and display raster data before a screen is updated.

3. The image display system according to claim 2, wherein the image display device further includes:
a synchronization signal generating unit that generates an image synchronizing signal for updating a screen of the display raster data generated by the data synthesizing unit on the basis of one of frame rate information included in the compressed moving picture data, refresh rate information output from the image data output device, and update period information used as a data generation period by the differential data generating unit; and
a scanning unit that performs a scanning process in the image forming unit on the basis of the generated image synchronizing signal.

4. The image display system according to claim 1, wherein the image display device further includes:
an image/audio separating unit that separates audio data included in the compressed moving picture data when the moving picture raster data is generated by the moving picture rasterizing unit;
an audio data decoder that decodes the audio data separated by the image/audio separating unit;
an audio output unit that outputs audio decoded by the audio data decoder; and
an audio output synchronization adjusting unit that synchronizes timing of the audio output made by the audio output unit with generation time of the moving picture raster data generated by the moving picture rasterizing unit.

5. The image display system according to claim 1, wherein the moving picture rasterizing unit further includes:
a decrypter;
a video decoder;
a scaler; and
a YUV-RGB converter.

6. The image display system according to claim 5, wherein:
the decrypter decodes the separated compressed moving picture data having copy protection;
the video decoder decodes the separated compressed moving picture data;
the scaler performs an expansion and contraction adjustment of the separated compressed moving picture data decoded by the video decoder; and
the YUV-RGB converter converts the separated compressed moving picture data decoded by the video decoder that is in a YUV format into a RGB format.

7. The image display system according to claim 1, wherein the display raster data synthesizing unit performs color correction processing based on image correction data received from the data demultiplexer.

8. The image display system according to claim 7, wherein the color correction processing includes at least one of brightness unevenness correction, color unevenness correction, and V-Tγ correction inherent in the image display device.

9. The image display system according to claim 8, wherein the color correction processing includes brightness unevenness correction, color unevenness correction, and V-Tγ correction inherent in the image display device.

10. An image display device that is connected to an image data output device through a transmission line and displays an image on the basis of image data output from the image data output device, the image data output device multiplexing and outputting raster data and compressed moving picture data, comprising:
a data receiving unit that receives data, which is transmitted from the image data output device, through the transmission line;
a data demultiplexer that separates the data received by the data receiving unit into individual data;
a moving picture rasterizing unit that performs a rasterizing process for separated compressed moving picture data so as to generate moving picture raster data, wherein the rasterizing process includes decoding the separated compressed moving picture data, the decoding of the separated compressed moving picture data including generation of graphic data corresponding to a region other than the moving picture display region;
a display raster data synthesizing unit that synthesizes the moving picture raster data generated by the moving picture rasterizing unit and the raster data so as to generate display raster data; and
an image forming unit that forms an image on the basis of the generated display raster data,
wherein the image data output device is configured to multiplex and output the raster data, the compressed moving picture data, and moving picture display region data indicating a display region, of a moving picture based on the compressed moving picture data, within the raster data; and
the compressed moving picture data is not decoded by the image data output device.

11. The image display device according to claim 10, further comprising:
an image/audio separating unit that separates audio data included in the compressed moving picture data when the moving picture raster data is generated by the moving picture rasterizing unit;
an audio data decoder that decodes the audio data separated by the image/audio separating unit;
an audio output unit that outputs audio decoded by the audio data decoder; and
an audio output synchronization adjusting unit that synchronizes timing of the audio output made by the audio output unit with generation time of the moving picture raster data generated by the moving picture rasterizing unit.

12. The image display device according to claim 10, wherein the moving picture rasterizing unit further includes:
a decrypter;
a video decoder;
a scaler; and
a YUV-RGB converter.

13. The image display device according to claim 12, wherein
the decrypter decodes the separated compressed moving picture data having copy protection;
the video decoder decodes the separated compressed moving picture data;
the scaler performs an expansion and contraction adjustment of the separated compressed moving picture data decoded by the video decoder; and
the YUV-RGB converter converts the separated compressed moving picture data decoded by the video decoder that is in a YUV format into a RGB format.

14. The image display device according to claim 10, wherein the display raster data synthesizing unit performs color correction processing based on image correction data received from the data demultiplexer.

15. The image display device according to claim 14, wherein the color correction processing includes at least one of brightness unevenness correction, color unevenness correction, and V-Tγ correction inherent in the image display device.

16. The image display device according to claim 15, wherein the color correction processing includes brightness unevenness correction, color unevenness correction, and V-Tγ correction inherent in the image display device.

17. An image data output device that multiplexes and outputs raster data and compressed moving picture data and displays an image on an image display device connected to the image data output device through a transmission line, comprising:
- a raster data acquisition unit that acquires the raster data;
- a compressed moving picture data acquisition unit that acquires the compressed moving picture data;
- a moving picture display region data generating unit that generates moving picture display region data indicating a display region, of a moving picture based on the compressed moving picture data, within the raster data;
- a data multiplexer that multiplexes the raster data acquired by the raster data acquisition unit, the compressed moving picture data acquired by the compressed moving picture data acquisition unit, and the moving picture display region data generated by the moving picture display region data generating unit;
- a data transmitting unit that transmits multiplexed data through the transmission line; and
- the compressed moving picture data is not decoded by the image data output device and is decoded by a moving picture rasterizing unit of the image display device wherein the decoding of the compressed moving picture data includes generation of graphic data corresponding to a region other than the moving picture display region.

18. The image data output device according to claim 17, wherein the moving picture rasterizing unit further includes:
- a decrypter;
- a video decoder;
- a scaler; and
- a YUV-RGB converter.

19. The image data output device according to claim 18, wherein
- the decrypter decodes the separated compressed moving picture data having copy protection;
- the video decoder decodes the separated compressed moving picture data;
- the scaler performs an expansion and contraction adjustment of the separated compressed moving picture data decoded by the video decoder; and
- the YUV-RGB converter converts the separated compressed moving picture data decoded by the video decoder that is in a YUV format into a RGB format.

20. The image data output device according to claim 17, wherein a display raster data synthesizing unit of the image display device performs color correction processing based on image correction data received from a data demultiplexer of the display device.

* * * * *